United States Patent
Takechi et al.

[11] Patent Number: 5,864,224
[45] Date of Patent: Jan. 26, 1999

[54] METHOD FOR CHARGING SECONDARY BATTERY AND CHARGER THEREFOR

[75] Inventors: Hiroaki Takechi; Tomohiro Ono; Masahito Suzuki, all of Iwata, Japan

[73] Assignee: Yamaha Hatsudoki Kabushiki Kaisha, Iwata, Japan

[21] Appl. No.: 704,495

[22] PCT Filed: Dec. 25, 1995

[86] PCT No.: PCT/JP95/02650

§ 371 Date: Oct. 29, 1996

§ 102(e) Date: Oct. 29, 1996

[87] PCT Pub. No.: WO96/20511

PCT Pub. Date: Jul. 4, 1996

[30] Foreign Application Priority Data

Dec. 26, 1994 [JP] Japan .................................. 6-323085
Jul. 28, 1995 [JP] Japan .................................. 7-193804

[51] Int. Cl.$^6$ .................................................... H02J 7/02
[52] U.S. Cl. ...................... 320/152; 320/150; 320/151; 320/148; 320/156; 320/157; 320/159
[58] Field of Search .................................. 320/30, 31–34, 320/35, 36, 37, 38, 39, 40, 150–152, 148, 155–159

[56] References Cited

U.S. PATENT DOCUMENTS

| | | |
|---|---|---|
| 4,670,703 | 6/1987 | Williams . |
| 4,727,306 | 2/1988 | Misak et al. ............................... 320/35 |
| 4,952,861 | 8/1990 | Horn . |
| 5,166,596 | 11/1992 | Goedken . |
| 5,196,780 | 3/1993 | Pacholok .................................. 320/40 |
| 5,204,611 | 4/1993 | Nor et al. ............................... 320/35 X |
| 5,302,887 | 4/1994 | Ishiguro et al. ............................. 320/32 |
| 5,363,031 | 11/1994 | Miller et al. .......................... 320/35 X |
| 5,391,974 | 2/1995 | Shojima et al. ........................... 320/35 |
| 5,519,302 | 5/1996 | Mino et al. ........................... 320/35 X |
| 5,563,494 | 10/1996 | Cuesta et al. ............................. 320/35 |
| 5,592,069 | 1/1997 | Dias et al. ............................... 320/30 |

FOREIGN PATENT DOCUMENTS

| | | |
|---|---|---|
| 4311586 | 10/1994 | Germany . |
| 2251346 | 7/1992 | United Kingdom . |
| 2276783 | 10/1994 | United Kingdom . |
| 9418738 | 8/1994 | WIPO . |

OTHER PUBLICATIONS

European Search Report dated Jun 9, 1997.

*Primary Examiner*—Peter S. Wong
*Assistant Examiner*—K. Shin
*Attorney, Agent, or Firm*—Knobbe, Martens, Olson & Bear LLP

[57] ABSTRACT

The present invention provides a method for charging a secondary battery and a charger by which it can be prevented that a secondary battery is charged at very high or low temperature, and that the secondary battery is charged for a long time. Therefore, the secondary battery is prevented from being damaged, so that the lifetime can be prolonged. In this method, a generally constant current is supplied from a charging means to the secondary battery. The constant-current charging is stopped when voltage of the secondary battery has reached a peak value after passage of a predetermined time period from start of the supplying of the first current; temperature of the secondary battery has been out of a predetermined range; or a predetermined time period has passed since start of the supplying of the first current.

10 Claims, 7 Drawing Sheets

METHOD FOR CHARGING SECONDARY BATTERY AND CHARGER THEREFOR

TECHNICAL FIELD

The present invention relates to a method for charging a secondary battery and a charger, the secondary battery being preferably used for a power supply of a motor-driven vehicle, such as a human-driven bicycle with an auxiliary power source.

BACKGROUND ART

Secondary battery, which is mounted on, for example, a human-driving vehicle with an auxiliary power source, is recharged by means of a battery charger connected to a domestic electrical outlet. Conventionally, Ni-Cd cells or the like are used for such a secondary battery.

In the charging of the Ni-Cd battery, the battery voltage is measured for controlling the charging. After the start of the charging, the battery voltage rises increasingly, and then becomes constant. After that, the voltage of the secondary battery B rises again and peaks once before the secondary-battery B is fully charged. After the peak, the voltage-drops continuously. When it is detected that the voltage of the secondary battery B drops by $\Delta V$ from the peak value, the charging is controlled to be finished.

In addition to such a measurement of the battery voltage, the charging time may be counted by a timer. In this case, the charging is finished when the voltage-drop $\Delta V$ has been detected, or when a prescribed time has passed.

It is known that charging of the Ni-Cd battery is affected by temperature very much. Therefore, in charging of the battery, it is possible that the lifetime of the battery is shortened if an appropriate control is not carried out on the basis of the temperature of the battery. However, such a charging method according to the battery temperature has not yet been proposed in fact.

DISCLOSURE OF INVENTION

It is, therefore, an object of the present invention to propose a method for charging a secondary battery in which lifetime of the secondary battery can be prolonged through an appropriate control depending on the battery temperature.

To resolve the above-described problem, according to the invention there is provided a method for charging a secondary battery, comprising steps of supplying a first current, which is generally constant, from a charging means to the secondary battery, and stopping the supply of the first current when one of the following conditions is fulfilled:
(A) voltage of the secondary battery has reached a peak level after passage of a predetermined time period from start of the supplying of the first current;
(B) temperature of the secondary battery has been out of a predetermined range; and
(C) a predetermined time period has passed since start of the supplying of the first current.

The invention is further characterized in that the method further comprises, after connecting of the secondary battery and the charging means, steps of checking as to whether the temperature of the secondary battery is in a predetermined range or not; and permitting to proceed to the step of supplying the first current insofar as the temperature of the secondary battery is in the predetermined range.

The invention is further characterized in that the method further comprises a step of supplying a second current, which is constant and lower than the first current, after stopping the supply of the first current for the reason of the condition (A) or (B).

The invention is further characterized in that the method further comprises steps of waiting until the temperature of the secondary battery falls to be below a predetermined level; and indicating that the charging has ended.

The invention is further characterized in that the method further comprises steps of checking as to whether the temperature of the secondary battery is in a predetermined range or not before and at the step of supplying the second current; and permitting to proceed to the step of supplying the second current insofar as the temperature of the secondary battery is in the predetermined range.

The invention is further characterized in that the method further comprises steps of waiting until the temperature of the secondary battery falls to be below a predetermined level after stopping the supply of the first current for the reason of the condition (C); and indicating that the charging has ended.

The invention is further characterized in that the method further comprises steps of checking as to whether the voltage of the secondary battery is above a predetermined level or not after the step of supplying the first current or the step of supplying the second current; and supplying the first current again if the voltage of the secondary battery is not above the predetermined level.

The invention is characterized in that the method further comprising, before permitting to proceed to the step of supplying the first current, a step of waiting a certain period after the temperature of the secondary battery falls to be in the predetermined range if the temperature of the secondary battery has been above the predetermined range in the step of checking the temperature.

According to the invention, there is provided a battery charger capable of supplying a generally constant current to a secondary battery, comprising:

current generating means for generating a constant current;

counting means for counting time from start of charging of the secondary battery;

voltage detecting means for detecting voltage of the secondary battery;

temperature detecting means for detecting temperature of the secondary battery; and controlling means for controlling supply of the constant current from the current generating means to the secondary battery, the controlling means stopping the supply of the current when one of the following conditions is fulfilled:

(A) the voltage detected by the voltage detecting means has reached a peak level after that the counting means counts a predetermined time period from start of the supplying of the current;
(B) the temperature detected by the temperature detecting means has been out of a predetermined range; and
(C) the counting means has counted a predetermined time period.

According to the invention, the controlling means starts to supply the current to the secondary battery insofar as the temperature detected by the temperature detecting means is in a predetermined range.

According to the invention, the current generating means generates a first current and a second current which is lower than the first current, the controlling means supplying the first current to the secondary battery and supplying the second current after stopping the supply of the first current for the reason of the condition (A) or (B).

According to the invention, the battery charger further comprises means for deciding finish of the supply of the second current, and indicating means for indicating end of the charging when the temperature detected by the temperature detecting means falls to be a predetermined level.

According to the invention, the controlling means checks as to whether the temperature of the secondary battery is in a predetermined range or not before and at the supplying the second current, and permits to supply the second current insofar as the temperature detected by the temperature detecting means is in the predetermined range.

According to the invention, the battery charger further comprises means for detecting that the counting means has counted a predetermined time period, thereby deciding finish of the supply of the constant current to the secondary battery, and indicating means for indicating end of the charging when the temperature detected by the temperature detecting means falls to be a predetermined level.

According to the invention, the controlling means checks as to whether the voltage detected by the voltage detecting means is above a predetermined level or not after supplying the first current or supplying the second current, and supplies the first current again if the voltage detected by the voltage detecting means is not above the predetermined level.

According to the invention, the battery charger further comprises second counting means for counting time from after the temperature of the secondary battery falls to be in the predetermined range if the temperature detected by the temperature detecting means has been above the predetermined range, the controlling means starts to supply the current to the secondary battery after that the second counting means has counted a predetermine time period.

Operation

According to the invention, since the constant current charging is finished when one of the conditions in relation to the voltage, temperature and charging time of the secondary battery is fulfilled, it can be prevented that the secondary battery is charged at high or low temperature under which the secondary battery is damaged, and that the secondary battery is charged for a long time. Accordingly, the lifetime of the secondary battery is enhanced.

According to the invention, although the secondary battery is connected with the charging means, the charging is not necessarily started immediately. The temperature of the secondary battery is checked and it is waited until the temperature becomes in a prescribed range if the temperature has been out of a prescribed range. Accordingly, it is possible to prevent the charging at low temperature as well as the charging at high temperature, whereby the damages on the battery can be avoided.

According to the invention, since the charging at the lower or second current is supplemented after the charging at the first current, the secondary battery is prevented from being overcharged and undercharged. In addition, since the second current is low, the overcharging is avoided surely.

According to the invention as defined in claim 4, 6, 12 or 14, since the end of the charging is indicated after the temperature of the secondary battery falls to be a predetermined level, it can be prevented that the secondary battery is discharged under high temperature condition, whereby the damage on the secondary battery is avoided.

According to the invention, it can also be prevented in the charging at the second current that the secondary battery is damaged by charging at high or low temperature.

If the secondary battery is remained to be connected to the charger for a long time, the voltage of the secondary battery is lowered due to self-discharge. According to the invention, since the charging is repeated when the voltage of the secondary voltage is not above the predetermined level, it is ensured that the secondary battery has the full voltage insofar as the end of charging is indicated.

According to the invention, when the temperature of the secondary battery falls to be a predetermined level, it is waited for a certain period and the secondary battery cools down naturally. The predetermined level for restricting the start of charging may be prescribed high. In contrast, if the predetermined level is low, there is likelihood that the charging can not be started eternally when ambient temperature is high as in summer. However, according to the above-mentioned method, the temperature of the secondary battery may be lowered to be below the predetermined level even if the ambient temperature is high as in summer.

BRIEF DESCRIPTION OF DRAWINGS

FIG. 2 (A) represents a circuit constituted of a thermistor and a charge-control unit shown in FIG. 1.

FIG. 2 (B) represents another example of the circuit constituted of the thermistor and the charge-control unit.

BEST MODE FOR CARRYING OUT THE INVENTION

A. First Embodiment

Figure 1:
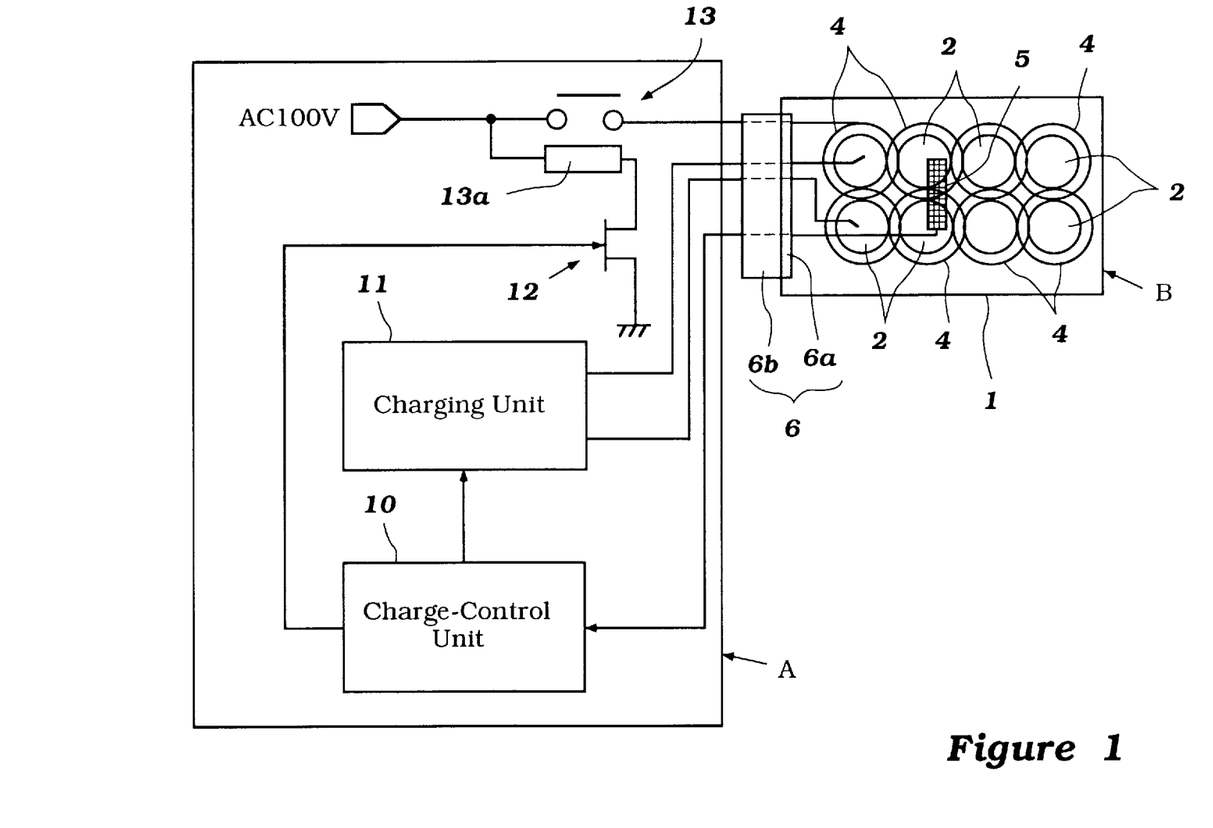
FIG. 1 is a circuit diagram schematically showing the connection between a charger according to the present invention and a secondary battery.

A first embodiment of the present invention will now be described with reference to FIGS. 1 through 4. FIG. 1 is a schematic view showing a circuit constituted of a battery charger A and a secondary battery B. As shown in this drawing, the secondary battery B comprises a battery case 1. A plurality of Ni-Cd cells 2 are connected in series inside the battery case 1. Belt-shaped heaters 4 are wound around the cells 2, respectively. These heaters 4 are also electrically connected in series. Inside the battery case 1, a thermistor 5 is disposed. The terminals of the cells 2, heaters 4, and thermistor 5 are situated in a receptacle 6a of a connector 6.

Next, in the battery charger A in this drawing, reference numeral 10 depicts a charge-control unit for controlling various elements in the battery charger A. The charge-control unit 10 provides a control signal for a charging unit 11. The charging unit 11, which is connected to a domestic electrical outlet (AC 100 V in FIG. 1), conducts and stops the charging of the secondary battery B under control of the charge-control unit 10. In addition, the charge-control unit 10 provides a relay-control signal for a gate of an FET 12, so that an exciting current flows to a coil 13a or stops, whereby a relay 13 is turned on or off.

When the relay 13 is turned on, a current is supplied from the domestic electrical outlet through the connector 6 to the heaters 4, so that the heaters 4 heat up the cells 2. The output voltage of the thermistor 5 is detected by the charge-control, unit 10, and the charge-control unit 10 controls the relay 13 on the basis of the output signal of the thermistor 5 representing the temperature of the cells 2. A plug 6b of the connector 6 is Coupled detachably in the receptacle 6a. The battery charger A includes a volt meter (not shown) inside thereof. The volt meter detects the voltage of the secondary battery B, and the voltage value of the secondary battery is input to the charge-control unit 10.

Figure 2A:
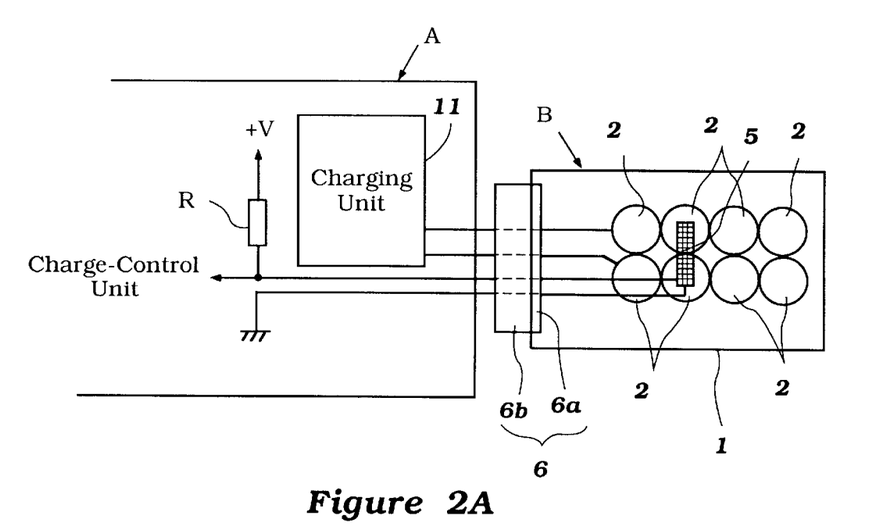
Figure 3:
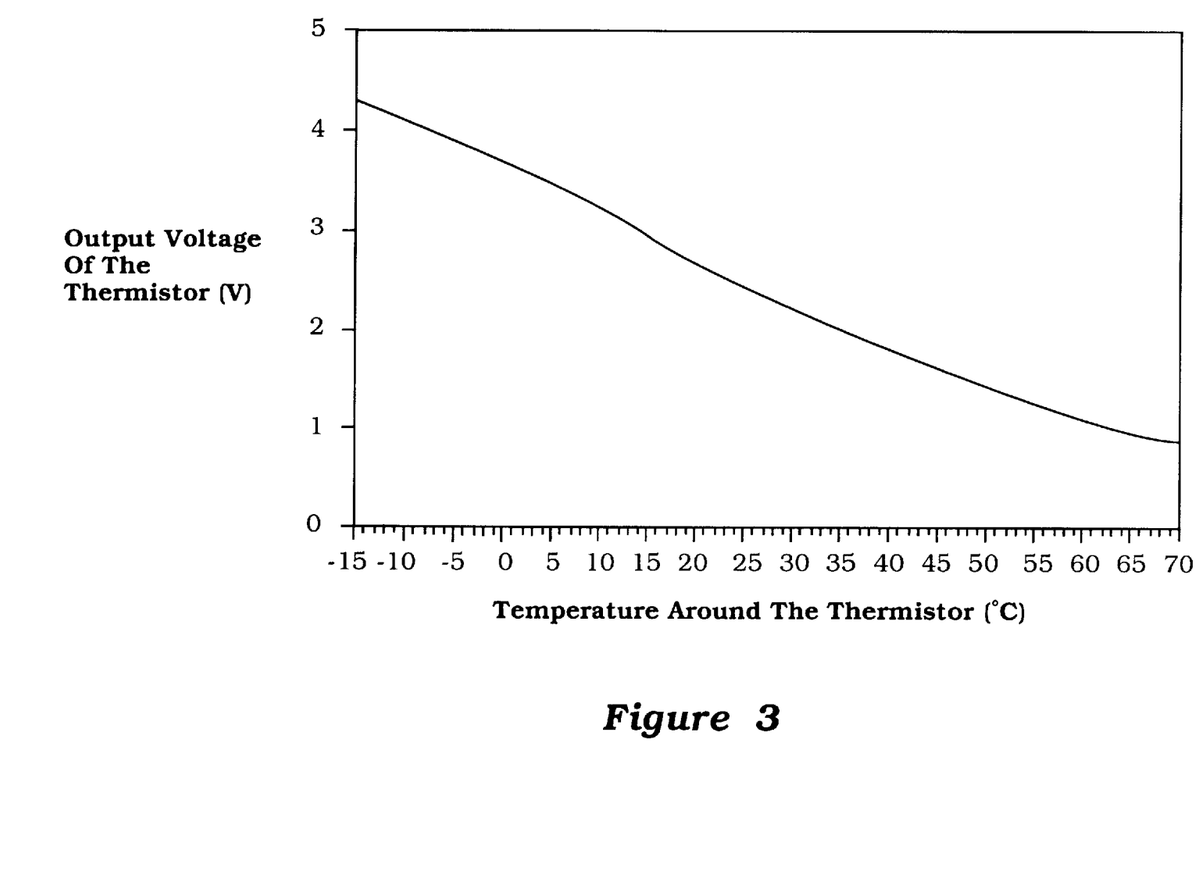
FIG. 3 is a graph showing a relation between temperature around the thermistor and output voltage of the thermistor.

FIG. 2 (A) represents a circuit constituted of the thermistor 5 and the charge-control unit 10 in detail. As shown in the drawing, while one terminal of the thermistor 5 is earthed via the connector 6, the other is connected to a direct current power supply (+V in the drawing) via the connector 6 and a resistor R when the plug 6b is securely engaged with the receptacle 6a. The voltage of the power supply is, e.g., +5 V. An intermediate portion of the line from the resistor R to the connector 6 is connected to the charge-control unit 10. In this circuit, the output voltage of the thermistor 5 is varied due to the temperature around the thermistor 5. FIG. 3 is a graph showing a relation between the temperature around the thermistor 5 and the output voltage of the thermistor 5 which should be provided for the charge-control unit 10. As clearly understood by this drawing, as the temperature around the thermistor 5 rises, the resistance of the thermistor 5 decreases, so that the output voltage is reduced.

Since the temperature around the thermistor 5 is usually between 0° and 40° C. when the battery charging is started, the output voltage provided for the charge-control unit 10 is between 1.8 and 3.7 V as understood by FIG. 3. However, the voltage of +5 V, from the power supply, is input directly to the charge-control unit 10 if the connection at the connector 6 is not secured, i.e., the plug 6b is not securely plugged in the receptacle 6a. Therefore, the voltage provided for the charge-control unit 10 is near the voltage of +5 V from the power supply. Accordingly, the charge-control unit 10 can decide as to whether the connection at the connector 6 is secured or not in accordance with the value of the input voltage of the charge-control unit 10. In order to conduct the decision, in a memory (not shown) of the charge-control unit 10, a standard range, e.g., 1.5 to 4.0 V, is stored. If the input voltage to the charge-control unit 10 is out of this range, the charge-control unit 10 decides that the connection at the connector 6 is not secured.

More specifically, the voltage of the direct current power supply of the battery charger A is divided by one or more resistors (not shown), so that 4.0 V, which is the highest value of the standard range, is obtained, and this voltage is provided for a negative terminal of a comparator (not shown). The positive terminal of the comparator is connected to a line which should be connected, at the connector 6, to the terminal of the thermistor 5. Therefore, the output voltage of the thermistor 5 is input to the positive terminal as long as the connection at the connector 6 is secured. When the input voltage of the charge-control unit 10 is in excess of 4.0 V, the output of the comparator becomes high level. In this case, it is determined that the connection between the battery charger A and the secondary battery B is not secured at the connector 6. On the contrary, when the input voltage of the charge-control unit 10 is lower than 4.0 V, the output of the comparator is low level. In this case, it is determined that the connection at the connector 6 is secured.

In this example, if the connection at the connector 6 is not secured, the input voltage of the charge-control unit 10 is higher than 4.0 V absolutely. Accordingly, it is unnecessary to check whether the input voltage is lower than 1.5 V which is the lowest value of the standard range although the lowest value is also stored in the memory, so that it is omitted to provide another comparator for comparing the input voltage of the charge-control unit 10 with 1.5 V.

Figure 2B:
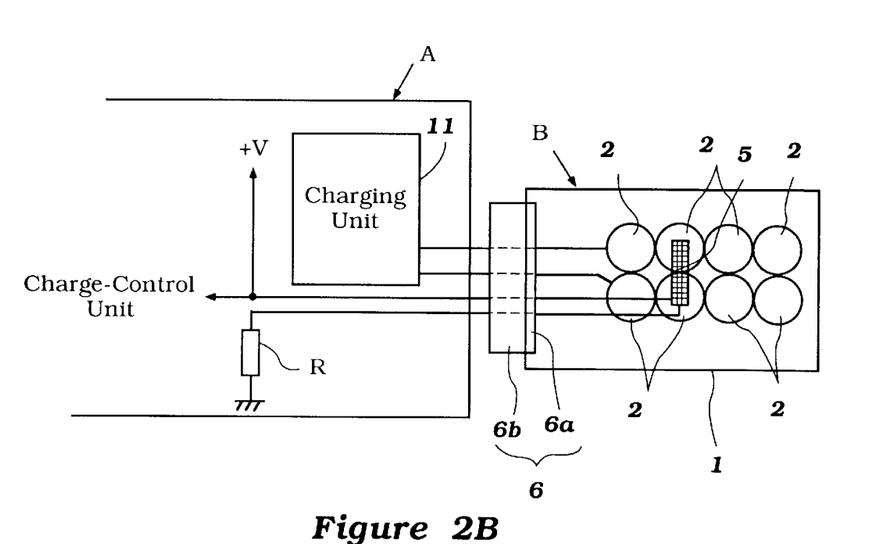

FIG. 2 (B) represents another example of the circuit constituted of the thermistor 5 and the charge-control unit 10. In this example, one terminal of the thermistor 5 is connected to a direct current power supply (+V in the drawing) via the connector 6 when the plug 6b is securely engaged with the receptacle 6a. The voltage of the power supply is, e.g., +5 V. The other terminal of the thermistor 5 is connected to the charge-control unit 10 via the connector 6 when the plug 6b is securely engaged with the receptacle 6a. An intermediate portion of the line from the charge-control unit 10 to the connector 6 is connected to the ground through a resistor R. In this circuit, as the temperature around the thermistor 5 rises, the resistance of the thermistor 5 decreases, so that the output voltage increases.

Usually, the output voltage provided for the charge-control unit 10 is between 1.5 and 3.7 V. However, the output voltage of the thermistor 5 is not input to the charge-control unit 10 if the connection at the connector 6 is not secured, and thus the input voltage to the charge-control unit 10 is between 0 and 1 V. Accordingly, the charge-control unit 10 can decide as to whether the connection at the connector 6 is secured or not in accordance with the value of the input voltage of the charge-control unit 10.

More specifically, the voltage of the direct current power supply of the battery charger A is divided by one or more resistors (not shown), so that 1.5 V, which is the lowest value of the above-mentioned standard range, is obtained, and the voltage is provided for a positive terminal of a comparator (not shown). The negative terminal of the comparator is connected to a line which is connected, at the connector 6, to the terminal of the thermistor 5. Therefore, the output voltage of the thermistor 5 is input in the negative terminal as long as the connection at the connector 6 is secured. When the input voltage of the charge-control unit 10 is in excess of 1.5 V, the output of the comparator becomes low level. In this case, it is determined that the connection between the battery charger A and the secondary battery B is secured at the connector 6. On the contrary, when the input voltage of charge-control unit 10 is lower than 1.5 V, the output of the comparator is high level. In this case, it is determined that the connection at the connector 6 is not secured.

In this example, if the connection at the connector 6 is not secured, the input voltage of the charge-control unit 10 is lower than 1.5 V absolutely. Accordingly, it is unnecessary to check whether the input voltage is higher than 4.0 V which is the highest value of the standard range although the highest value is stored in the memory, so that it is omitted to provide another comparator for comparing the input voltage of the charge-control unit 10 with 4.0 V.

Figure 4:
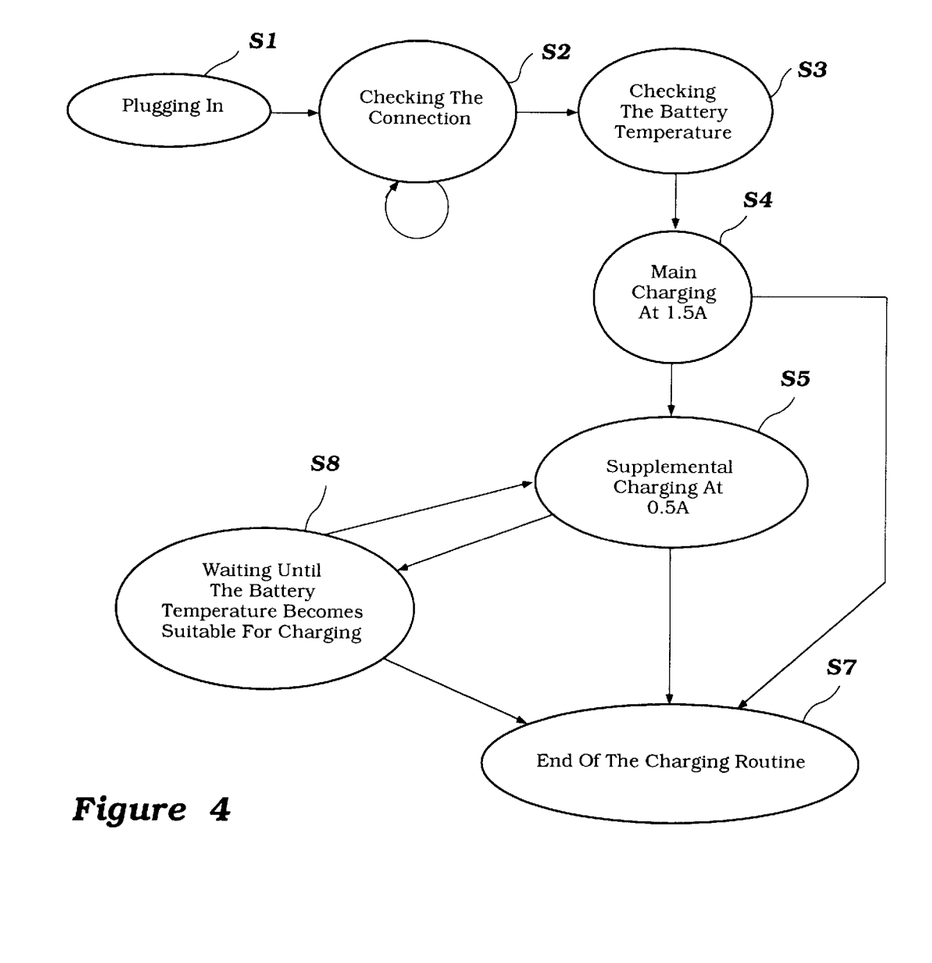
FIG. 4 is a state transition diagram representing a first embodiment of the charging routine to which the method of the present invention is applied.

Next, the method for charging the secondary battery B using with the above battery charger A will be described. FIG. 4 is a diagram showing a state transition of the battery charger A. In this diagram, sequential procedures from Step S1 to Step S7 consists of a normal processing in a case that the charging of the secondary battery is normally conducted. This normal processing will be first described. In this charging routine, in order to inform the user of the charging state, an LED is used. According to the state of the charging, the lighting of the LED is continued, stopped, intermitted at longer intervals, or intermitted at shorter intervals. In the description hereinafter, the switching manners of the LED will be also mentioned.

In order to start charging, the user connects the battery charger A to the domestic electrical outlet at Step S1, so that the charge-control unit 10 of the battery charger A is started to be operated. Next, the charge-control unit 10 decides, at Step S2, as to whether the plug 6b of the battery charger A is plugged in the receptacle 6a of the secondary battery B or not according to the input voltage of the charge-control unit 10.

At Step S2, if the temperature around the thermistor 5 is, for example, 15° C., the voltage of the thermistor 5 provided for the charge-control unit 10 should be 3 V as shown in FIG. 3. Accordingly, as long as the plug 6b is plugged in the receptacle 6a securely, the input voltage of the charge-control unit 10 is in the standard range stored in the charge-control unit 10. Therefore, the charge-control unit 10 decides that the connection between the receptacle 6a and the plug 6b is secured, and then the routine proceeds to Step S3. On the contrary, if the plug 6b is not plugged in the receptacle 6a, the input voltage of the charge-control unit 10 is out of the standard range stored previously. In the example shown in FIG. 2 (A), the input voltage is near +5 V which is the voltage of the direct current power supply. Thus, the charge-control unit 10 decides that the receptacle 6a and the plug 6b are disconnected from each other. In this case, the charge-control unit 10 repeats, at Step S2, the decision until the plug 6b is inserted into the receptacle 6a securely.

At Step S3, the charge-control unit 10 decides as to whether the battery temperature detected by the thermistor 5 is in a prescribed range between $T_1°$ and $T_2°$ C. or not. When the temperature of the secondary battery B is below $T_1°$ C., the charge-control unit 10 turns on the relay 13 for switching the heaters 4 on. On the other hand, when the temperature of the secondary battery B is above $T_2°$ C., the charge-control unit 10 waits until the temperature of the secondary battery B falls to be below $T_2°$ C. The reason why the battery temperature is checked before the start of the charging is that if the secondary battery B is charged at a low temperature below $T_1°$ C., the charging efficiency will be remarkably lowered, so that the secondary battery is likely undercharged, and a part of the battery electrolyte inside the cells 2 will be vaporized, so as to shorten the lifetime of the cells 2. Moreover, it is known by experiments that if the charging is conducted at a high temperature, the lifetime of the secondary battery is also affected. For the same reason, as will be described later, the highest limit of the temperature during the charging process is prescribed at $T_3°$ C. The charging is started as far as the temperature is below $T_2°$ C. which is lower than $T_3°$ C.

Until the routine proceeds to Step S3, the LED is not turned on, but when the routine proceeds to Step S3, the LED is switched to light up intermittently at longer intervals. Thus, the user can know that the charging routine transits to the temperature-checking state of Step S3.

If the temperature of the secondary battery B is in the prescribed range, the routine proceeds to Step S4. At Step S4, the cells 2 are provided with electric charges, in other words, the cells 2 are recharged. At Step S4, the LED is turned on to light up continuously, so that the user can be aware that the charging has started. This charging is conducted at a constant current value, e.g., 1.5 A. At the beginning of the charging, a timer (not shown), contained in the charge-control unit 10, is started to operate. If a certain time period $t_1$ has passed since the start of the timer, the charging is stopped and the routine proceeds to Step S7, and then the routine ends, as will be described later. In addition, if the battery temperature is below $T_1°$ C. at Step S4, the routine will proceed to Step S7, as will be also described later in detail At Step S4, after the start of the charging, the battery voltage rises increasingly, and then becomes constant. After that, the voltage of the secondary battery B rises again and peaks once before the secondary battery B is fully charged. After the peak, the voltage-drops continuously. When it is detected that the voltage of the secondary battery B drops by $\Delta V$ from the peak value, the charging at the constant current of 1.5 A is finished, and the routine proceeds to Step S5.

However, at the initial stage of the charging, the voltage of the secondary battery B is not stable, and the voltage of the secondary battery B sometimes decreases by a value more than $\Delta V$. Therefore, in this charging routine, the detection of the voltage-drop $\Delta V$ is omitted in a certain time period after the start of the charging. For this purpose, a detection-delay timer (not shown) contained in the charge-control unit 10 is operated.

The main charging at 1.5 A is also finished when it is detected that the battery temperature reaches the above-mentioned highest limit (finishing temperature), i.e., $T_3°$ C. above $T_2°$ C. In other words, if the voltage-drop $\Delta V$ is detected or the finishing temperature $T_3°$ C. is detected, the routine proceeds from Step S4 to Step S5. The finishing temperature $T_3°$ C. is prescribed above the highest limit value $T_2°$ C. of the starting temperature since it is normal that the temperature of the secondary battery B rises during the charging. In this charging routine, since the main charging at 1.5 A is finished on the basis of the battery temperature, the secondary battery B is prevented from being damaged.

If the finishing temperature $T_3°$ C. is prescribed below a certain value, the detection of the finishing temperature $T_3°$ C. may be omitted in a certain time period after the start of the charging. For example, if the finishing temperature $T_3°$ C. is prescribed equal to $T_2°$ C., it will be detected that the temperature of the secondary battery B reaches $T_3°$ C. ($T_2°$ C.) immediately after the start of the charging although it is detected that the initial temperature is below $T_2°$ C. before Step S4. Such a problem will occur by errors of the temperature-detection although the temperature of the secondary battery B falls for the reason of the endothermic reaction in a short period after the start of the charging. However, if it is omitted to detect the finishing temperature $T_3°$ C. in a certain time period after the start of the charging, it is prevented that the charging is finished immediately after the charging is started.

Next, at Step S5, the reason why the routine proceeds from Step S4 to Step S5 is referred, and the switching manner of the LED is varied on the basis of that reason. That is, if the detection of the voltage-drop $\Delta V$ is the reason for proceeding to Step S5, the LED is turned off and it does not light continuously. On the other hand, if the reason for proceeding to Step S5 is the detection of the finishing temperature $T_3°$ C., the LED is switched to light up intermittently at shorter intervals. Thus, the user can know that the Step S4 has ended for the reason of an abnormal temperature of the secondary battery.

At Step S5, the cells 2 are charged at a constant current value, e.g., 0.5 V, which is lower than the value at Step S4. This secondary charging is called "supplemental charging" in the following description. The reason of the supplemental charging is that the cells 2 of the secondary battery B have been sometimes not fully charged when the voltage-drop $\Delta V$ has been detected in the main charging at 1.5 A. However, after the voltage-drop $\Delta V$ is detected, if the main charging at 1.5 A is continued, the cells 2 may be overcharged. Therefore, in the embodiment of the charging routine, the charging is supplemented at the lower current value (0.5 A), so that the secondary battery is prevented from being overcharged and undercharged. The supplemental charging is conducted for a prescribed time period $t_2$ using with the timer (not shown), and after this period, the routine proceeds to Step S7 for ending.

If the normal charging has been conducted before Step S7, the LED is maintained to be off. Consequently, the Led is not lighted up at Steps S5 and S7. Thus, there is likelihood that the user disconnects the secondary battery B from the electrical outlet at Step S5, so as to finish the charging compulsorily. However, since the charging has substantially completed at the finish of Step S4, there is no problem for the usage of the secondary battery.

The normal processing has been described hereinbefore. Next, procedures when abnormalities happen will be described. First, in the main charging at 1.5 A of Step S4, there is likelihood that the voltage-drop $\Delta V$ nor the finishing temperature $T_3°$ C. are not somehow detected for a long time. In this case, if the main charging at 1.5 A is continued, the secondary battery will be damaged by overcharging and so on. Therefore, at Step S4, if a certain time period $t_1$ has passed since the start of the main charging at 1.5 A, the charging is stopped and the routine proceeds to Step S7 for ending. In this case, the routine does not pass through the supplemental charging at 0.5 A (Step S5) since it is considered that the secondary battery B has been charged substantially fully by the main charging at the constant current of 1.5 A for the certain time.

In addition, it is assumed that the surrounding temperature of the secondary battery falls to be below $T_1°$ C. in a case that, for example, after starting of the charging in a room, a heater for the room is switched off. If the charging is continued in this case, a part of the battery electrolyte inside the cells 2 will be vaporized, so as to shorten the lifetime of the cells 2. Therefore, if the battery temperature falls to be below $T_1°$ C. at Step S4, the routine proceeds to Step S7, and the LED is switched to light up intermittently at shorter intervals for informing the user of the temperature has been abnormal.

However, in a case that the temperature of the secondary battery B has been near $T_1°$ C. before starting to charge, it is possible that the battery temperature falls to be below $T_1°$ C. by the endothermic reaction immediately after the starting of Step S4. In this case, it is inconvenient to stop charging. Therefore, the detection of the battery temperature is omitted in a certain time period after the start of the charging, using with the detection-delay timer, as similar to the omission of the finishing temperature $T_3°$ C.

Furthermore, if the charging is conducted when the battery temperature is above $T_3°$ C., the quality of the secondary battery deteriorates as mentioned above. Thus, when the battery temperature reaches the finishing temperature $T_3°$ C. at Step S4, it is necessary to avoid that the routine proceeds to Step S5 for charging at the constant current value of 0.5 A. Accordingly, at Step S5, it is determined as to whether the battery temperature is above $T_3°$ C. or not. If the decision is made that the temperature is above $T_3°$ C., the routine proceeds to Step S8, and waits for that the battery temperature falls to the appropriate range at Step S5. consequently, if the reason for proceeding to Step S5 is the detection of the finishing temperature $T_3°$ C. at Step S4, the routine proceeds to Step SB immediately after the proceeding to Step S5.

The switching manner of the LED, at Step S8, is varied according to the step when the abnormality of the battery temperature has been detected, so as to inform the user of the step. That is, if the battery temperature has risen to be above $T_3°$ C. in the supplemental charging of Step S5 before proceeding to Step S8 (and the temperature has been normal at Step S4), the LED is turned off, and the lighting is stopped continuously at Step S8 since such an abnormality of the temperature is not a significant problem. On the other hand, if the battery temperature has reached $T_3°$ C. at Step S4, the LED is switched to light up intermittently at Step S8 since the abnormality is thoughtful.

At Step S8, if the battery temperature is above $T_3°$ C., the routine waits for that the secondary battery B is naturally cooled down and for that the temperature falls to a certain value slightly below $T_3°$ C. When the battery temperature falls to be below this value, the routine returns to Step S5 and the supplemental charging at 0.5 A is restarted. After the complete of the supplemental charging at 0.5 A, the routine proceeds to Step S7 for ending.

On the other hand, there is likelihood that the prescribed time period $t_2$ has passed, in the waiting state of Step S8, since the beginning of the supplemental charging at 0.5 V. In this case, the routine proceeds to Step S7 and the charging ends.

If the main charging has been stopped at Step S4 since the battery temperature has fallen to be below $T_1°$ C., the LED is switched to light up intermittently at Step S7. The LED is controlled in the same manner if the main charging at 1.5 A has been stopped since the battery temperature has risen to be above $T_3°$ C. Accordingly, the user can know some kinds of significant problem about the temperature of the cells 2 have happened during the charging procedures. In other cases, the LED is turned off or maintained to be off at Step S7.

In the above-described charging method, since the charging at the constant current value at Step S4 is finished on the basis of one of the voltage of the secondary battery B, the temperature of the secondary battery B, and the charging time period, it is avoided that the charging is conducted under high or low temperature conditions or for very long time, so that the secondary battery B is prevented from being damaged. The lifetime of the secondary battery is prolonged.

In addition to these advantageous effects of the present invention, the following advantages are achieved by the embodiment.

In the embodiment, directly after the connection of the secondary battery B and the battery charger A, the charging is not started necessarily. Instead, the routine waits until the temperature of the secondary battery B falls to the prescribed range at Step S3. Accordingly, charging under high or low temperature conditions is surely avoided, so that the secondary battery is prevented from being damaged. Besides, since the charging is supplemented at 0.5 A after the main charging at 1.5 A, the secondary battery is prevented from being overcharged and undercharged. Also, since the current value of the supplemental charging is low, the secondary battery is prevented from being overcharged.

Furthermore, in the embodiment, since the cells 2 are surrounded by heaters 4, respectively, each of the cells 2 are uniformly heated up, and the temperature can be controlled exactly during the charging. In addition, since the connection at the connector 6 is checked by means of the circuit for the thermistor 5, the cost for production of the checking circuit is not enhanced very much.

Additionally, in the embodiment, if the battery temperature falls to be below $T_1°$ C. during the main charging at 1.5 A of Step S4, the routine proceeds to Step S7 and has ended. In this situation, the LED indicates that the abnormal temperature has been detected in a short time period after starting to charge. Accordingly, the user recognizes that the battery temperature has been extraordinarily low, and can make a suitable procedure, for example, restarting to charge in another room at an appropriate temperature.

In the embodiment, it is decided as to whether the connection is secured or not at the connector 6 by means of the checking of the connection between the thermistor 5 and the charge-control unit 10. Accordingly, it is unnecessary to use special wiring or other elements for the checking, and thus, the checking can be conducted economically by a software programmed for the charge-control unit 10. Moreover, even if overcurrent has been discharged from the secondary battery B or a short circuit exists inside the secondary battery B, it is possible to check the connection in spite of such problems.

B. Second Embodiment

Figure 5:
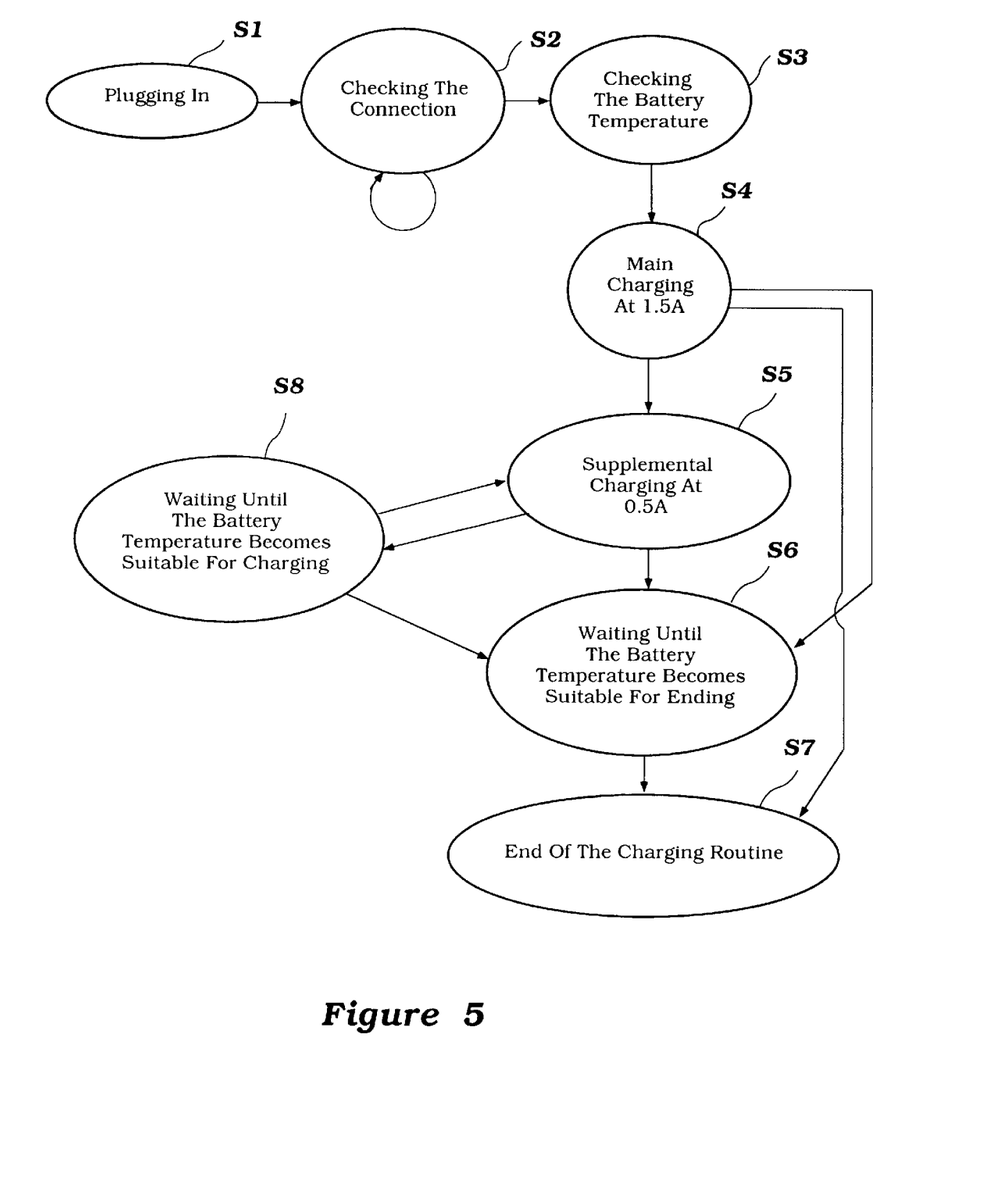
FIG. 5 is a state transition diagram representing a second embodiment of the charging routine.

Next, with reference to FIG. 5, a second embodiment of the charging routine will be described. The second embodiment is different from the above-described first embodiment in that Step S6 is added between Steps S5 and S7. At Step S6, the routine waits for that the temperature of the secondary battery falls to the suitable level for ending the charging routine. Additionally, if a prescribed time $t_1$ has passed since the beginning of the charging at Step S4, the routine proceeds to Step S6. In addition, the routine may proceed from Step S8 to Step S6. Other procedures are the same as in the first embodiment, and therefore the description thereof is omitted.

At Step S4, if a prescribed time $t_1$ has passed since the beginning of the main charging at 1.5 A, the charging is stopped, and then the routine proceeds to Step S6. At Step S6, the routine waits until the temperature of the secondary battery B falls. On the other hand, when the battery temperature falls to be below $T_1°$ C. at Step S4, the routine proceeds to Step S7 for ending, as similar to the first embodiment.

The reason for adding Step S6 is that the temperature of the cells 2 are high directly after the finish of charging. It is known that if the cells 2 are discharged in such a condition, various disadvantageous effects will occur, for example, the lifetime of the secondary battery will be shortened. Therefore, after the supplemental charging at 0.5 A of Step S5, the routine waits until the battery temperature falls to be a certain level slightly above $T_2°$ C. at Step S6, and then the routine ends. At Steps S5 and S6, the LED is continued to be on, and when the routine proceeds to Step S7, the LED is turned off. This switching manner indicates that the charging has been conducted normally.

In the second embodiment, after the routine proceeds to Step S8, it proceeds from Step S8 to Step S6 for waiting until the temperature drop as long as it does not return to Step S5, while in the first embodiment, the routine proceeds from Step S8 directly to S7 for ending.

At Step S8, the LED is maintained to be on in any case. When the routine proceeds from Step S8 via Step S6 to Step S7, the LED is turned off for indicating that the charging has ended.

However, if the battery temperature falls to be below $T_1°$ C. in the main charging at 1.5 A of Step S4, the routine proceeds to Step S7 for ending, but in this case, the LED is switched to light up intermittently at shorter intervals at Step S7, so as to indicate that the abnormality on temperature has occurred. In addition, if the battery temperature rises to be above $T_3°$ C. at Step S4, the LED is also switched to light up intermittently at shorter intervals at Steps S5, S6 and S7, so as to indicate the temperature abnormality.

In accordance with the second embodiment, the same advantages by the first embodiment can be achieved. In addition, the routine is ended after the temperature of the secondary battery E falls to be the certain temperature, and then the LED indicates that the routine is ended, as described above. Therefore, the user can use the secondary battery after the LED is turned off, thereby avoiding to use the secondary battery, and preventing it from being damaged. The lifetime of the secondary battery can be prolonged.

C. Third Embodiment

Figure 6:
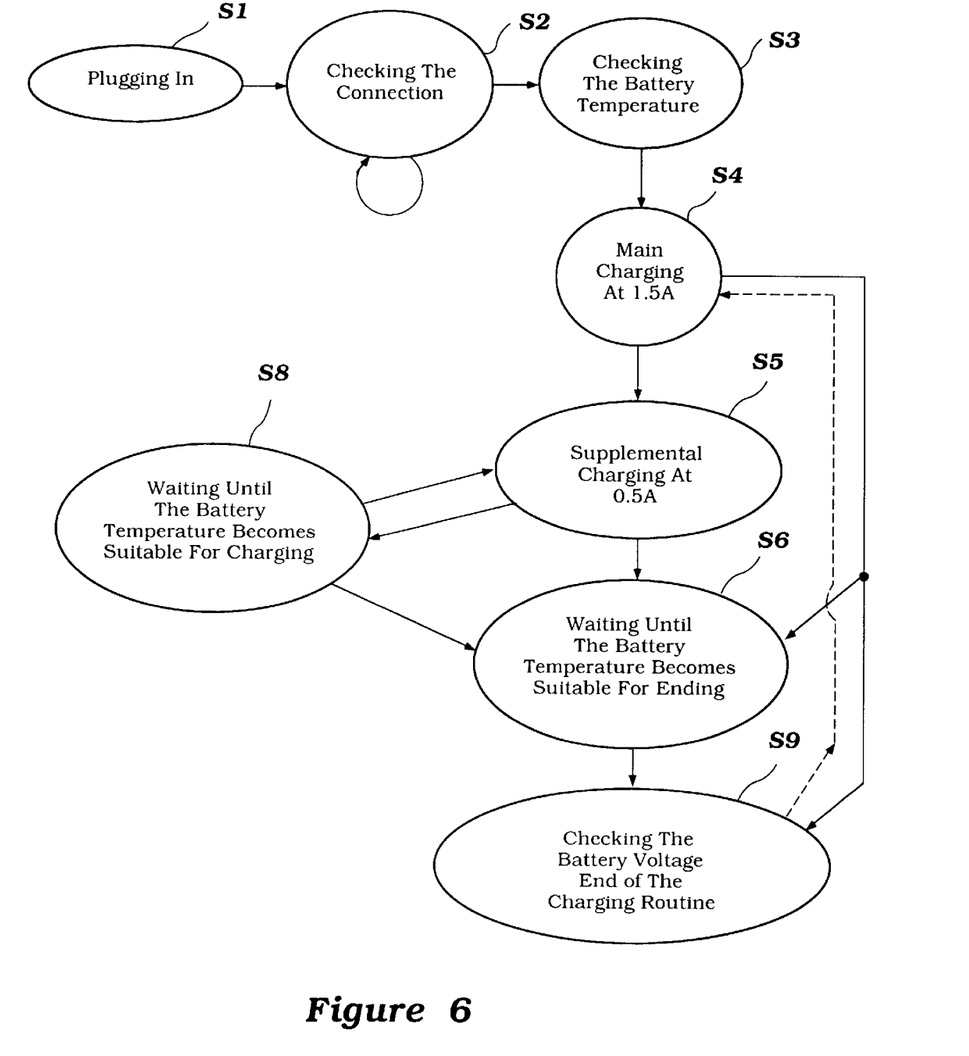
FIG. 6 is a state transition diagram representing a third embodiment of the charging routine.

Next, with reference to FIG. 6, a third embodiment of the charging routine will be described. The third embodiment is different from the above-described embodiments in that a complementary charging is added. That is, after Step S6, the voltage of the secondary battery is measured and it is decided as to whether the voltage reaches a certain usage-startable level or not at Step S9. If the decision is made that the voltage is less than this level, the routine returns to Step S4, so that the main charging at the constant current of 1.5 A is conducted again in order to complement the charging.

The routine does not proceed from the second main charging at 1.5 A to Step S5. Instead, it proceeds from the second main charging to Step S5 if the voltage-drop ΔV or the finishing temperature $T_3°$ C. has been detected, or if the prescribed time $t_1$ has passed since the restart of the main charging at 1.5 A. On the other hand, if the battery temperature falls to be below $T_1°$ C. in the second main charging of Step S4, the routine proceeds to Step S9 for ending. In the third embodiment, the detection-delay timer is also used, and in a certain time period after the restart of the charging, it is omitted to detect the voltage-drop ΔV and to detect the battery temperature.

In accordance with the third embodiment, as similar to the second embodiment, the lifetime of the secondary can be prolonged. Furthermore, in the third embodiment, although self-discharging occurs so that the battery voltage decreases since the secondary battery is connected with the battery charger for a long time after the end of the charging, the main charging at 1.5 A is conducted again for complementing. Therefore, it is ensured that the battery voltage is above the usage-startable level as long as the end of the charging is indicated by the LED.

D. Fourth Embodiment

A fourth embodiment of the present invention will now be described with reference to FIG. 7. The fourth embodiment is different from the first embodiment in that waiting process S3' is carried out if necessary, and the temperature inside the charger A is detected, at Steps 3, 4, 5, and 8, for reference of control of the charging by the charge-control unit 10.

Figure 7:
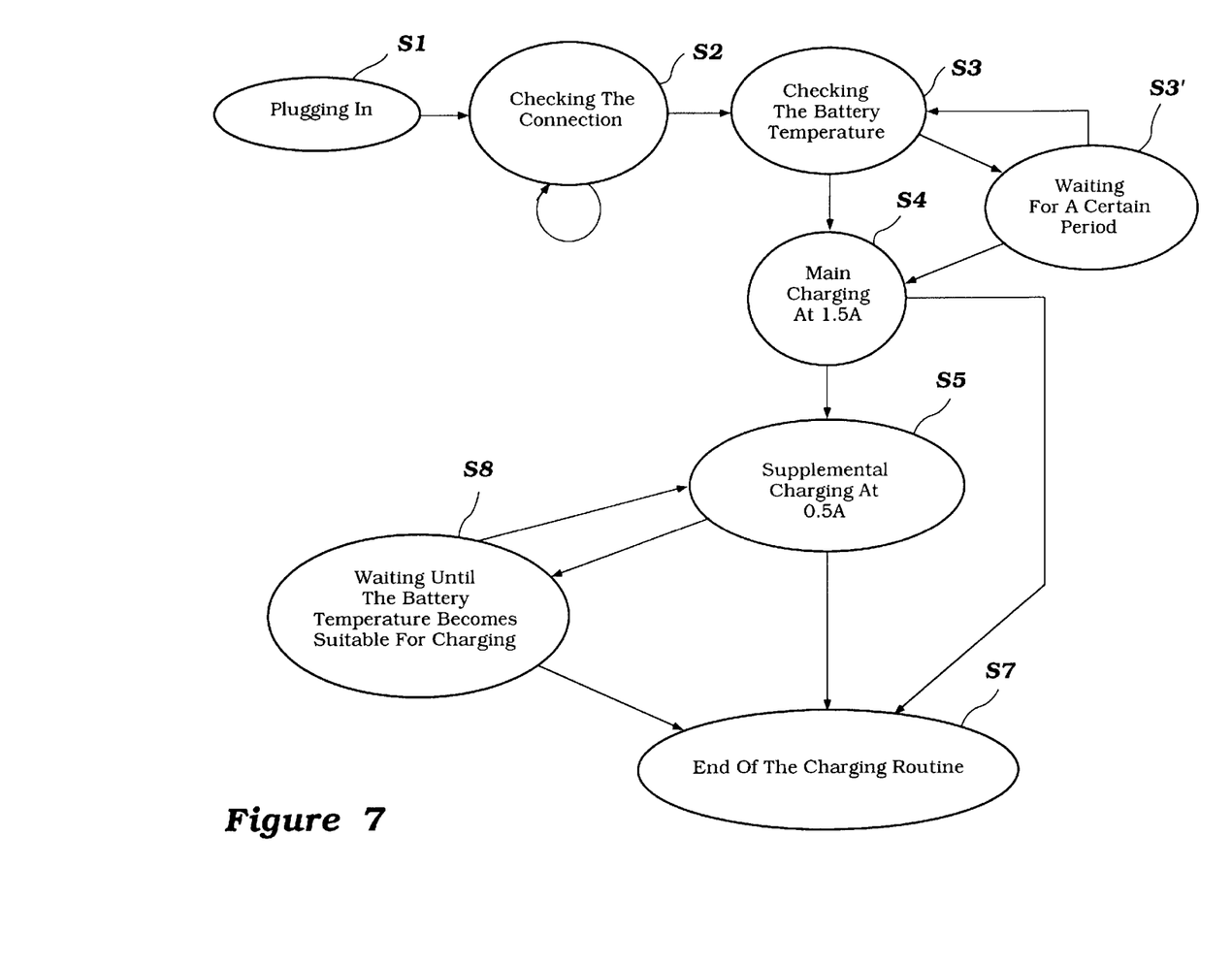
FIG. 7 is a state transition diagram representing a fourth embodiment of the charging routine.

The procedures at Steps S1 and S2 of FIG. 7 are the same as those in the first embodiment in FIG. 4. Next, at Step S3, the charge-control unit 10 decides as to whether the battery temperature detected by the thermistor 5 is in a prescribed range between $T_1$ and $T_2°$ C. or not. When the temperature of the secondary battery B is below $T_1°$ C., the charge-control unit 10 turns on the relay 13 for switching the heaters 4 on. On the other hand, when the temperature of the secondary battery B is above $T_2°$ C., the charge-control unit 10 waits until the temperature of the secondary battery B falls to be below $T_2°$ C.

Until the routine proceeds to Step S3, the LED is not turned on, but when the routine proceeds to Step S3, the LED is switched to light up intermittently at longer intervals. Thus, the user can know that the charging routine transits to the temperature-checking state of Step S3.

Additionally, at Step S3, it is decided whether the temperature inside the charger A is lower than $T_4°$ C. or not. If the decision is Yes, the routine proceeds to Step S4. The reason for this decision is that if the inside temperature of the charger A remarkably rises in comparison with the ambient temperature, electronic elements within the chargers A will be broken.

As described above, when the battery temperature and the inside temperature of the charger A are within the predetermined range, the routine proceeds to Step S4. At Step S4, the cells 2 are provided with electric charges, in other words, the cells 2 are recharged. In case that the capacitance of the secondary battery is 5 Ampere-Hours, the charging at Step S4 is conducted at a constant current value of 1.5 A (0.5×3 A). At the beginning of Step S4, the LED is turned on to light up continuously, so that the user can be aware that the charging has started. The process at Step S4 will be described in detail later.

In the fourth embodiment, after the charge-control unit 10 waits until the temperature of the secondary battery B falls to be below $T_2°$ C., the routine proceeds to Step S3', and then waits a certain period. The reasons are as follows. Although it is necessary to prescribe the highest limit value $T_2°$ C. of the battery temperature as low as possible in normal environment so that the charging is carried out at near normal temperature, there is likelihood that if the highest limit value $T_2°$ C. is low and near the normal temperature, the battery temperature cannot fall to be less than $T_2°$ C. in summer or hot environment. Therefore, in order to avoid such a inconvenience, the highest limit value $T_2°$ C. is prescribed higher in the present embodiment, and the routine waits for a certain period $t_3$, so that it is expected that the battery temperature can fall to be much lower than the highest limit value $T_2°$ C.

After waiting for the certain time $t_3$ at Step S3, the routine proceeds to Step S4, and then, the main charging at 1.5 A is conducted. However, if the ambient temperature is increased, there is likelihood that the battery temperature rises to be above the highest limit value $T_2°$ C. at the waiting process of Step S3'. In this case, the routine returns to Step S3 where the battery temperature is checked again. At the waiting process of Step S3 ', the LED is switched to light up intermittently at longer intervals.

At Step S4, when the voltage-drop ΔV is detected, the main charging at 1.5 V is finished, and the routine proceeds to Step S5 With reference to the detection of the voltage-drop ΔV, the detection-delay timer (not shown) is also used, and in a certain time period after the restart of the charging, it is omitted to detect the voltage-drop ΔV as in the first embodiment. In addition to the detection of the voltage-drop ΔV, the main charging at 1.5 A is finished when the battery temperature rises to be above the finishing temperature $T_3°$ C., $T_3$ being higher than $T_2$. Then, the routine proceeds to Step S5. In this case, it is also omitted to detect the finishing temperature $T_3°$ C. in a certain time period after the restart of the charging.

The normal processing, in which the main charging at Step S4 is normally carried out, has been described hereinbefore. On the other hand, if abnormality happen at Step S4, the routine proceeds to Step S7 for ending. Next, the conditions, for which the routine proceeds from Step S4 to Step S7, will be described. First, in the main charging at 1.5 A of Step S4, there is likelihood that the voltage-drop ΔV nor the finishing temperature $T_3°$ C. are not somehow detected for the prescribed time period $t_1$. In this case, the routine does not pass through the supplemental charging at 0.5 A (Step S5) since it is considered that the secondary battery B has been charged substantially fully by the main charging. Instead, the routine proceeds to Step S7 for ending, and the LED is turned off, so that the ending of the charging is indicated.

In addition, it is assumed that the surrounding temperature of the secondary battery falls to be below $T_1°$ C. in a case that, for example, after starting of the charging in a room, a heater for the room is switched off. Therefore, if the battery temperature falls to be below $T_1°$ C. at Step S4, the routine proceeds to Step S7.

Furthermore, if the temperature of the secondary battery B has been near $T_1°$ C. before starting to charge, it is possible that the battery temperature falls to be below $T_1°$ C. by the endothermic reaction immediately after the starting of Step S4. Therefore, the detection of the battery temperature is omitted in a certain time period after the start of the charging, using with the detection-delay timer, as similar to the omission of the finishing temperature $T_3°$ C.

Additionally, if the temperature inside the battery charger A rises to be above $T_4°$ C., the routine proceeds to Step S7 for ending.

Furthermore, although the plug 6b of the battery charger A is plugged in the receptacle 6a of the secondary battery B, so that the checking result at Step S2 is Yes, the charging current is likely not supplied if the supply-cables are disconnected in fact. In this case, a current sensor (not shown) in the charging unit 11 indicates that the supplied current is zero. In response, the charge-control unit 10 controls that the routine proceeds to Step S7 for ending.

When one of the above abnormalities occur, the LED is switched to light up intermittently at shorter intervals for informing the user of the interruption of the charging by the abnormality.

Next, at Step S5, the supplemental charging at 0.5 A is conducted as in the first embodiment. At Step S5 in the present embodiment, the LED is turned off although the reason for proceeding to Step S5 is that the battery temperature has risen to be above the finishing temperature $T_3°$ C. If the predetermined time period $t_2$ has passed since the start of the supplemental charging, the routine proceeds to Step S7 for ending, and then, the LED is turned off.

In addition, when the temperature inside the battery charger A rises to be above $T_4°$ C., the routine proceeds to Step S7 for ending. Furthermore, if the current supply is not detected at Step S5 because of disconnection of the supply-cables or the like although the check decision is Yes, the routine proceeds to Step S7. In those instances, the LED is switched to light up intermittently at shorter intervals, so as to indicate the abnormality.

When the battery temperature rises to be above the finishing temperature $T_3°$ C. at Step S5, the routine proceeds to Step S8. At Step S8, the routine waits for that the battery temperature falls to the appropriate range. After the battery temperature falls, the routine returns to Step S7 for ending. If the prescribed time period $t_2$ has passed in the waiting state of Step S8, the routine also proceeds to Step S7 and the charging ends. In this case, the LED is turned off since it can be considered that the charging has been carried out sufficiently.

Not only at Steps 4 and 5, but also at Step S8, if the temperature inside the charger A rises to be above $T_4°$ C., the routine proceeds to Step S7 for ending. In addition, if the charging current is not supplied by disconnection of the supply-cables or the like, the routine proceeds to Step S7 for ending. In these cases, the LED is switched to light up intermittently at shorter intervals for informing the user of the interruption of the charging by the abnormality.

In accordance with the fourth embodiment, the same advantages can be achieved as those by the first embodiment. Moreover, although the highest limit value $T_2°$ C. is prescribed high, it is expected that the battery temperature can be naturally lowered at the waiting process of Step S3'. Accordingly, even if room temperature is high, for example, in summer, the routine can proceed to the next step for carrying out the main charging.

E. Variations and Modifications

Although the various features of the present invention has been described with reference to the accompanying drawings, it is to be understood that the invention is not limited to the foregoing description and the various modifications may be made in the invention as will be described in the following.

(1) The current values, charging time periods, and the temperature values in the main charging and the supplemental charging are optional.

(2) Although in the third embodiment, the routine returns to Step S5 from Step S9 in accordance with the decision at Step 9, the routine may return to Step S5 for conducting the supplemental charging at 0.5 A.

(3) In the second embodiment, if the certain time period $t_1$ has passed since the start of the timer in the main charging at 1.5 A of Step S4, the routine proceeds to Step S6 and waits until the battery temperature falls for ending. However, it is possible in the same situation that the routine proceeds from Step S6 to S7 directly for ending.

(4) In the third embodiment, if the certain time period $t_1$ has passed since the start of the timer in the main charging at 1.5 A of Step S4, the routine proceeds to Step S6 and waits until the battery temperature falls to be suitable for ending. However, it is possible that the routine proceeds from Step S6 directly to S9 for checking the battery voltage is appropriate for practical usage in the same situation. Additionally, in the second embodiment, it is possible to replace Step S7 by Step S9 as similar to the third embodiment.

(5) In the embodiments and the above-mentioned variations, during the waiting state for the temperature drop at Step S8, the timer-counting started at the beginning of the supplemental charging (Step S5) is continued. However, the timer-counting may be interrupted at the beginning of Step S8, and when the routine returns to Step S8 to Step S5, the counting may be started for the remaining time.

(6) It may happen that the battery charger A becomes disconnected from the electrical outlet or the secondary battery B becomes disconnected from the battery charger during the charging. In such cases, it is possible to return to the initial state (Step Sl) and to restart the charging.

(7) Heating devices for the cells are optional and not limited to heaters 4 of the above-described embodiments. For example, the battery case 1 may contain a heater which raises the atmospheric temperature therein.

F. Advantageous Effects

As described hereinbefore, according to the present invention, it can be prevented that secondary battery is charged at high temperature or low temperature in which the secondary battery is damaged. In addition, the secondary battery is prevented from being charged for a long time. Accordingly, the lifetime of the secondary battery can be prolonged.

Industrial Applicability

The present invention can be applied to a method for charging a secondary battery and a charger, the secondary battery being preferably used for a power supply of a motor-driven vehicle, such as a human-driven bicycle with an auxiliary power source.

We claim:

1. A method for charging a secondary battery comprising the steps of supplying a first current, which is generally constant, from a charging means to the secondary battery, and checking each of the following conditions and stopping the supply of the first current when any one of the them is fulilled: (A) the voltage of the secondary batter has reached a peak level after passage of a predetermined time period from start of the supplying of the first current; (B) the temperature of the secondary battery is out of a predetermined range; and (C) a predetermined time period has passed since start of the supplying of the first current, checking as to whether the temperature of the secondary battery is in a predetermined range after connecting of the secondary battery and charging means; and only proceeding to the step of supplying the first current if the temperature of the secondary battery is in the predetermined range, supplying a second current which is constant and lower tan the first current, only if the supply of the first current has stopped for the reason of the condition (A) or (B), waiting until the temperature of the secondary battery falls to be below a predetermined level; and then indicating that the charging has ended.

2. A method for charging a secondary battery comprising the steps of supplying a first current, which is generally constant, from a charging means to the secondary battery, and checking each of the following conditions and stopping the supply of the first current when any one of the them is fulfilled: (A) the voltage of the secondary battery has reached a peak level after passage of a predetermined time period from start of the supplying of the first current; (B) the temperature of the secondary battery is out of a predetermined range; and (C) a predetermined time period has passed since start of the supplying of the first current, checking as to whether the temperature of the secondary battery is in a predetermined range after connecting of the secondary battery and charging means; and only proceeding to the step of supplying the first current if the temperature of the secondary battery is in the predetermined range, supplying a second current which is constant and lower than the first current, only if the supply of the first current has stopped for the reason of the condition (A) or (B), checking as to whether the temperature of the secondary battery is in a predetermined range or not before and at the step of supplying the second current; and supplying the second current insofar as the temperature of the secondary battery is in the predetermined range.

3. A method for charging a secondary battery comprising the steps of supplying a first current, which is generally constant, from a charging means to the secondary battery, and checking each of the following conditions and stopping the supply of the first current when any one of the them is fulfilled: (A) the voltage of the secondary battery has reached a peak level after passage of a predetermined time period from start of the supplying of the first current; (B) the temperature of the secondary battery is out of a predetermined range; and (C) a predetermined time period has passed since start of the supplying of the first current, checking as to whether the temperature of the secondary battery is in a predetermined range after connecting of the secondary battery and charging means; and only proceeding to the step of supplying the first current if the temperature of the secondary battery is in the predetermined range, waiting until the temperature of the secondary battery falls to be below a predetermined level; and then indicating that the charging has ended.

4. A method for charging a secondary battery as defined in claim 1 further comprising steps of checking as to whether the voltage of the secondary battery is above a predetermined level after at least one of the steps of supplying the first current and supplying the second current; and supplying the first current again if the voltage of the secondary battery is not above the predetermined level.

5. A method for charging a secondary battery as defined claim 1, further comprising a step of waiting a certain period after the temperature of the secondary battery falls to be in the predetermined range if the temperature of the secondary battery has been above the predetermined range in the step of checking the temperature before proceeding to the step of the supplying the first current.

6. A battery charger capable of supplying a generally constant current to a second battery, comprising: current generating means for generating a constant current; counting means for counting time from start of charging of the secondary battery; voltage detecting means for detecting voltage of the secondary battery; temperature detecting means for detecting temperature of the secondary battery; and controlling means for controlling supply of the constant current from the current generating means to the secondary battery, said controlling mean stopping the supply of the current when any one of the following conditions is fulfilled: (A) the voltage detected by said voltage detecting means has reached a peak level after the counting means counts a predetermined time period from start of the supplying of the current; (B) the temperature detected by the detecting means is out of a predetermined range; and (C) the counting means has counted a predetermined time period, the current generating means generating a first current and a second current which is lower than the first current, the controlling means initially supplies the first current to the secondary battery and thereafter supplies the second current after stopping the supply of the first current for the reason of the condition (A) or (B), and means for deciding to finish of the supply of the second current, and indicating means for indicating end of the charging when the temperature detected by the temperature detecting means falls to a predetermined level.

7. A battery charger as defined in claim 6, wherein the controlling means checks if the temperature of the secondary battery is in a predetermined range before and during the supplying the second current, and permits the supply of the second current only when the temperature detected by the temperature detecting means is in the predetermined range.

8. A battery charger capable of supplying a generally constant current to a secondary battery, comprising: current generating means for generating a constant current; counting means for counting time from start of charging of the secondary battery; voltage detecting means for detecting voltage of the secondary battery; temperature detecting means for detecting temperature of the secondary battery; and controlling means for controlling supply of the constant current from the current generating means to the secondary battery, said controlling mean stopping the supply of the current when any one of the following conditions is fulfilled: (A) the voltage detected by said voltage detecting means has reached a peak level after the counting means counts a predetermined time period from start of the supplying of the current; (B) the temperature detected by the detecting means is out of a predetermined range; and (C) the counting means has counted a predetermined time period, sand means for detecting that the counting means has counted a predetermined time period, thereafter terminating the supply of the constant current to the secondary battery, and indicating means for indicating end of the charging when the temperature detected by the temperature detecting means falls to a predetermined level.

9. A battery charger as defined in claim 6, wherein the controlling means checks when the voltage detected by the voltage detecting means is above a predetermined level after supplying at least one of the first current or the second current, and supplies the first current again if the voltage detected by the voltage detecting means is not above the predetermined level.

10. A battery charger as defined in claim 6, further comprising second counting means for counting time from after the temperature o the secondary battery falls in the predetermined range if the temperature detected by the temperature detecting means has been above the predetermined range, the controlling means starts to supply the current to the secondary battery after that the second counting means has counted a predetermine time period.

* * * * *

UNITED STATES PATENT AND TRADEMARK OFFICE
CERTIFICATE OF CORRECTION

PATENT NO.    : 5,864,224
DATED         : January 26, 1999
INVENTOR(S)   : Takechi et al.

It is certified that error appears in the above-identified patent and that said Letters Patent is hereby corrected as shown below:

Column 16,
Line 7, please change "fulilled:" to -- fulfilled: --.

Signed and Sealed this

Twenty-seventh Day of August, 2002

*Attest:*

*Attesting Officer*

JAMES E. ROGAN
*Director of the United States Patent and Trademark Office*